Figure 1:
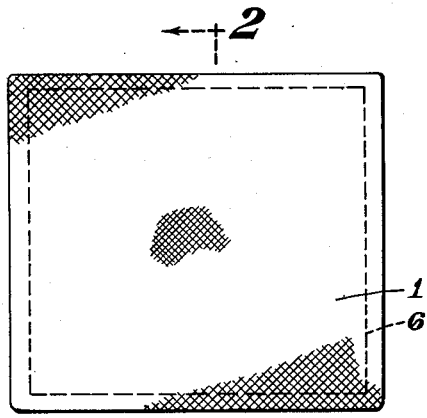

Feb. 25, 1947.  H. W. HUSE ET AL  2,416,524
COMPOSITE FILTERING MEDIUM AND METHOD OF FILTERING
Filed Oct. 16, 1943

Herbert W. Huse
Carl R. Faust
Theodore L. Leininger
INVENTORS

BY Walter C. Wheeler
ATTORNEY

Patented Feb. 25, 1947

2,416,524

UNITED STATES PATENT OFFICE 2,416,524

COMPOSITE FILTERING MEDIUM AND METHOD OF FILTERING

Herbert W. Huse, Swarthmore, Pa., and Carl R. Faust and Theodore L. Leininger, Wilmington, Del., assignors to E. I. du Pont de Nemours & Company, Wilmington, Del., a corporation of Delaware Application October 16, 1943, Serial No. 506,548

1 Claim. (Cl. 210—204)

This invention relates to filtering devices, and especially to an improved filtering medium.

In manufacturing processes involving the filtration of solutions for producing filtrates free from solid or semi-solid aggregates, it is common to use devices wherein the liquid to be filtered is forced through a filtering medium. Heretofore filter packs have been made by combining permeable fibrous materials in various ways, but in so far as I am aware no combination of such materials is entirely satisfactory for filtering viscous solutions, such as viscose, solutions of cuprammonium cellulose or cellulose esters and ethers in various solvents, such as solutions of cellulose acetate in acetone or other solvents.

For such filtrations, especially where the filtrate is to be used for extrusion through fine spinneret orifices for making continuous filaments, it is necessary for satisfactory operation of the spinnerets that the solution be perfectly free from solid particles and that it be of perfectly uniform consistency. Although such liquids appear to be perfectly homogeneous before they are filtered, they actually contain highly swollen particles of the plastic material of jelly-like consistency, varying in size from a fraction of a micron to several hundred microns in diameter. In order to produce a satisfactory filtration of such a liquid, the filter medium must retain substantially all the larger jelly-like masses. Satisfactory filtration has been accomplished in the past by using a filter medium, especially in the last stage which would produce satisfactory filtrates but would become clogged before a satisfactory through-put of filtrate was attained. One such filter medium was composed essentially of material of relatively weak structure so that clogging soon produced a condition where the pressures sufficient to force the liquid through the filter exceeded the strength of the material and rupturing resulted. Such structures require frequent renewal and they are costly in material, process apparatus and labor per unit of through-put. Attempts to provide filter media or filter packs having longer service have commonly resulted in poor filtering with a consequent deterioration in the spinnability of the solution or they have resulted in the necessity of using excessively high pressures for forcing the solution through the filter.

It is among the objects of the present invention to provide a filter pack which will have a relatively large through-put capacity of solution of satisfactory quality without developing an excessively high differential pressure across the filter. Another object of the invention is to provide a filter pack of simple and economical construction which will enable operations at a relatively rapid rate. Other objects of the invention will be apparent from the following description.

Figure 2:
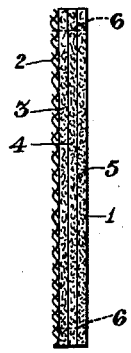
Figure 3:
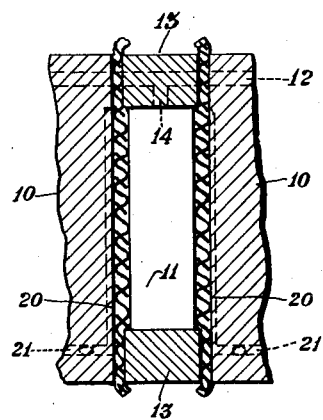

The improved filter medium constructed in accordance with the present invention comprises a layer of relatively strong finely woven fabric, such as muslin, overlain in order with a self-sustaining layer of sheeted felted cellulose fibers, then with a layer of sheeted cellulose wadding and finally with a facing layer of loosely woven web of textile material such as gauze or cheese cloth, all as more particularly illustrated with reference to the drawing constituting a part hereof in which Fig. 1 is a side elevational view of a filter pack made in accordance with the invention, Fig. 2 is a cross sectional view of the pack taken along the line 2—2 of Fig. 1, Fig. 3 is a partial view of a conventional filter press with parts cut away showing one manner of using the filter material.

Figure 4:
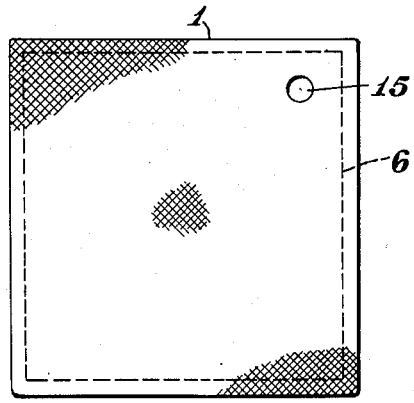

Fig. 4 is a side elevational view of the filter pack, showing an opening for providing a duct therethrough.

Referring to the drawing, Fig. 2 shows a filter pack 1 composed of a layer of muslin 2, a self-sustaining sheet of fiber 3 of uniform thickness composed of felted cotton linters or of wood fiber, a thin layer of cotton batting 4 of uniform thickness and a cover sheet of loosely woven cotton gauze 5, similar to surgeon's gauze. The several layers are desirably held together by stitching 6 near their edges. In the modification shown, the layers are stitched together at all the edges in order to provide the maximum securing means, but other means of securing the sheets together, such as partial attachment by clipping or stapling the layers together at the corners or at the sides is often sufficient to maintain the layers in place.

The filter pack is assembled in the filter press with the muslin facing 2 in contact with the filter plate 10 and with the facing of loosely woven fabric facing the space 11 wherein the unfiltered solution is forced as by pumping.

In the conventional type of filter press shown in Fig. 3 the liquor is pumped into space 11 through the duct or passage 12 formed by ports passing through the filter plates 10, separators 13 and filter pack 1. For use in the type of filter press shown in Fig. 4, the filter packs 1 are desirably perforated with openings 15 near the corner for registering with the openings or ports 12 through the plates 10 and spaces 13 when they are assembled. Such ports are provided at other and appropriate places when the pack is used in other types of presses.

Referring to Fig. 3, the spacer ring 13 of the filter press completes the enclosure 11. The filter packs act as gaskets between the filter plates and spacers for preventing leakage when the plates are clamped together and assembled for operation. In the filter press illustrated, the spacer ring 13 is provided with a T-shaped duct 14 which communicates with the ducts 12 in the filter plates through the openings in filter packs 1 and with the space 11 enclosed by the spacer and filter packs.

In operation the material to be filtered is pumped through the ducts 12 and 14 into space 11. After passing through the filter packs, the filtered liquor passes downwardly through ducts formed by the filter pack and suitably formed grooving 20 in the face of the filter plate. These grooves communicate with passages 21 in the plates which lead to suitable receptacles which receive the filtered liquor.

The layer of sheeted self-sustaining felted fibrous cellulose is desirably composed of short fibers such as linters of cotton or wood fiber but the density of this material may be varied somewhat by using fibers of various selected lengths or by using a mixture of longer and shorter fibers. A sheet of uniform thickness of such material about .04 inch thick is desirable. Such a sheet composed of wood fiber weighs about 1¼ ounces per square foot, but satisfactory results may be obtained by using thicker, thinner, more dense or less dense sheets, or a plurality of sheets of such material depending somewhat on the characteristics of the solution to be filtered. Pulp sheets about .04 inch thick which are commonly provided to viscose manufacturers for the manufacture of viscose are especially well adapted for this purpose. The sheeted cellulose wadding should also be of uniform density and thickness and it may be composed of sheeted carded cotton, wood or other cellulose fibers. In general a sheet of such material weighing about 1 to 6 ounces per square yard is a desirable thickness. The thinner layers are preferred. Such a layer when uncompressed will have a thickness roughly of about $\frac{1}{16}$ to $\frac{1}{8}$ of an inch, but considerable variation in the thickness of this layer is tolerable. The muslin layer should be unsized and it should not have a nap. Muslin such as unbleached muslin having a weight of about 0.44 ounce per square foot gives excellent results. The layer of open weave cotton, such as cotton net, serves primarily as a protective coating or support for the wadding and it protects the wadding from roughing or breaking by handling and from disintegration or sagging after it is impregnated with the liquid to be filtered. An open woven soft fabric resembling surgeon's gauze is desirable for this purpose. Since this material primarily serves as a protective support for one of the layers, any open weave fabric, preferably soft and of light weight, can be used.

A filter pack composed of a single or multiple sheet of sheeted fibrous material, either supported on muslin or not supported on muslin produces good filtrates for a short period, but the amount of filtrates that can be forced through such a filter without building up an excessively high pressure across the filter is relatively small as compared to structures provided by the present invention. The thin coating of wadding over the felted fiber sheet provided in accordance with the present invention permits at least twice as much through-put of filtrate, when operated under like conditions on the same viscous solution as that permitted by muslin-supported fiber sheets without the thin layer of wadding. Filter packs giving satisfactory filtrates can also be made by combining into a structure resembling a pillow, a thick pad of cotton wadding between sheets of a heavy woven napped cotton fabric, such as Canton flannel. For the production of filtrates of the quality produced by the filter pads constructed in accordance with the present invention, an excessively large amount of cotton wadding is required and a costly grade of Canton flannel is necessary. In the manufacture of such pillow-like pads great care must also be taken to provide a perfectly uniform thick layer of cotton wadding. The pillow-like filter packs are costly to manufacture and the through-put of filtrate of like satisfactory quality attainable is considerably less than that attainable with the packs constructed in accordance with the present invention.

The improvement in through-put of the combinations of the present invention may be accounted for on the theory that the layer of loose cotton acts to separate the larger gels or arrest their movement beyond the layer of loose cotton, whereby the larger gels are largely or entirely prevented from reaching the denser linter pulp sheet or from blocking the pores thereof during filtering. The denser medium is thereby enabled to act largely as the medium to filter out the smaller particles which according to this theory are less effective as clogging agents for the smaller pores of the denser pulp sheet than are the larger gels.

Viscous solutions such as those hereinbefore referred to are commonly filtered in stages, the most meticulous operations being required in the final stage in order to insure perfectly uniform filtrates free from jelly-like aggregates or solids which would lodge in a spinneret orifice. The filter medium provided by applicant's combination is especially advantageous for removing jelly-like aggregates and minute solids commonly removed in the final filtrations since it gives a large through-put of the high quality of filtrate desired, but it can be used in any stage of the filtration with good results.

From the foregoing disclosure it will be recognized that the invention is susceptible of modification without departing from the spirit and scope thereof and it is to be understood that the invention is not restricted to the specific illustrations thereof herein set forth.

We claim:

In the purification of viscous liquids which comprises passing the solution thereof through a filter medium for separating the solution from solids and jelly-like material contained therein, the process which comprises disposing on a support a composite filter medium comprising a layer of cellulose wadding supported by an overlaying sheet of open weave net cotton material, a uniform layer of sheeted self-sustaining felted fibrous cellulose and a layer of a muslin, and passing the solution through said medium by forcing it first through said overlaying sheet and finally through said muslin.

HERBERT W. HUSE.
CARL R. FAUST.
THEODORE L. LEININGER.

REFERENCES CITED

The following references are of record in the file of this patent:

UNITED STATES PATENTS

| Number | Name | Date |
|---|---|---|
| 2,316,721 | Schwartz | Apr. 13, 1943 |
| 754,053 | Derham | Mar. 8, 1904 |
| 2,288,426 | Stack | Jun. 30, 1942 |
| 1,831,094 | Clayes | Nov. 10, 1931 |
| 2,341,414 | Polivka | Feb. 8, 1944 |
| 1,674,600 | Mackenzie | June 19, 1928 |
| 1,971,606 | Grant | Aug. 28, 1934 |
| 2,092,749 | Bradshaw | Sept. 14, 1937 |
| 2,196,821 | Arnold | Apr. 9, 1940 |

FOREIGN PATENTS

| Number | Country | Date |
|---|---|---|
| 174,174 | British | Jan. 18, 1922 |
| 363,213 | British | Dec. 17, 1937 |